United States Patent

Sayo et al.

[11] 4,295,553
[45] Oct. 20, 1981

[54] ELECTROMAGNETIC CLUTCH

[75] Inventors: Kosaku Sayo, Katsuta; Atsushi Suginuma; Hideo Tatsumi, both of Mito; Hisanobu Kanamaru, Katsuta, all of Japan

[73] Assignee: Hitachi, Ltd., Tokyo, Japan

[21] Appl. No.: 109,259

[22] Filed: Jan. 3, 1980

[30] Foreign Application Priority Data

Jan. 8, 1979 [JP] Japan .................................. 54-307

[51] Int. Cl.³ ............................................. F16D 27/10
[52] U.S. Cl. ................................ 192/84 C; 29/522 R; 335/281
[58] Field of Search ........... 192/84 C; 29/521, 522 R; 335/250, 281; 188/161, 164

[56] References Cited

U.S. PATENT DOCUMENTS

| | | | |
|---|---|---|---|
| 2,549,214 | 4/1951 | Lilja | 188/164 X |
| 2,644,350 | 7/1953 | Regimbald | 29/520 |
| 3,055,470 | 9/1962 | Pierce | 192/84 C |
| 3,415,347 | 12/1968 | Wrensch | 335/281 X |
| 3,565,223 | 2/1971 | Pierce | 192/84 |
| 3,703,227 | 11/1972 | Murakami et al. | 192/84 C |
| 4,069,572 | 1/1978 | Pierce et al. | 192/84 C X |
| 4,090,161 | 5/1978 | Fuhrer et al. | 192/84 C X |
| 4,125,298 | 11/1978 | Heurich et al. | 29/522 R X |
| 4,126,215 | 11/1978 | Puro | 192/84 C |
| 4,150,738 | 4/1979 | Sayo et al. | 192/84 C |

FOREIGN PATENT DOCUMENTS 20-181163 12/1945 Japan .

Primary Examiner—Rodney H. Bonck
Attorney, Agent, or Firm—Craig and Antonelli

[57] ABSTRACT

An electromagnetic clutch having an energizing device including a cylindrical yoke assembly composed of a yoke member and a yoke holder, and a winding housed in the yoke assembly. The yoke member has an outer cylindrical wall and an inner cylindrical wall constituting a double wall cylindrical structure, and a doughnut-shaped bottom wall connecting the outer and inner cylindrical walls together. The outer cylindrical wall is tapering in going from the bottom wall toward the upper end, and the inner cylindrical wall has a constant thickness lower portion of a predetermined height contiguous with the bottom wall and a tapering portion contiguous with the constant thickness lower portion and having its thickness successively reduced in going toward the upper end. The inner cylindrical wall has an annular groove formed on its inner circumferential surface in its constant thickness lower portion. When the yoke member and the yoke holder is assembled, the yoke holder is force fitted to the yoke member and a clamping force is exerted on the yoke assembly in such a manner that the latter is plastically deformed to have its material flow into the annular groove of the yoke member to form a joint, whereby the yoke member can be firmly fitted to the yoke holder.

11 Claims, 7 Drawing Figures

ELECTROMAGNETIC CLUTCH

BACKGROUND OF THE INVENTION

1. Field of the Invention

This invention relates to magnetic clutch constructions, and more particularly it is concerned with an energizing device for an electromagnetic clutch suitable for use with a refrigerator for vehicles.

2. Description of the Prior Art

In one type of energizing device for an electromagnetic clutch known in the art, the energizing device comprises a main yoke member, a yoke assembly composed of an auxiliary yoke member of major diameter and an auxiliary yoke member of minor diameter, and an energizing winding mounted through an insulator in a space defined between the main yoke member and the auxiliary yoke member of major diameter.

The main yoke member which is substantially in the form of a cup includes a cylindrical portion and a bottom formed of a steel sheet by means of a press. The auxiliary yoke member of major diameter is cylindrical in shape and joined to the bottom of the main yoke member by force-fitting or welding. The auxiliary yoke member of minor diameter is also cylindrical in shape and joined to the bottom surface of the main yoke member by friction welding.

In the energizing device of the type described, three independent members are joined together into a single device which has at least two joints, so that it has hitherto been necessary to perform a time-consuming operation of forming the joints.

When the energizing device of the type comprising the aforesaid assembly of yoke members and energizing winding is assembled with components of an electromagnetic clutch, the surfaces of the cylindrical yoke members are arranged in juxtaposed relation to a rotary shaft with a very small clearance therebetween. Thus, in this type of energizing device, it has been necessary that its yoke members be maintained in concentric relation with one another. However, the plurality of surfaces of the device that should be maintained concentric with one another belong to different members, so that it is necessary to use one of such surfaces as a reference surface and to impart machining finishes to the rest of the surfaces. This would make the machining operation time consuming and troublesome.

SUMMARY OF THE INVENTION

This invention obviates the aforesaid disadvantages of the prior art. Accordingly, the invention has as its object the provision of an energizing device for an electromagnetic clutch wherein the joints are reduced in number and the surfaces requiring machining are small in number.

The characterizing features of the invention are that the energizing device comprises a yoke assembly composed of a yoke member substantially in the form of a letter U in a lying position in cross section and a yoke holder of a cylindrical shape of varying diameters inserted in a space in the yoke member, and that the yoke member includes a tapering outer flange and an inner flange having a large thickness portion of a predetermined value disposed near the bottom, and a tapering portion contiguous with the large thickness portion and extending toward the upper end, so that the yoke holder can be fitted firmly to the yoke member by mechanical means.

BRIEF DESCRIPTION OF THE DRAWINGS

FIG. 2 being a vertical sectional view of the yoke member, FIG. 3 being a vertical sectional view of the yoke holder and FIG. 4 showing the manner in which pressure is applied to the assembly of the yoke member and the yoke holder by means of metal dies;

DETAILED DESCRIPTION OF THE PREFERRED EMBODIMENTS

Figure 1:
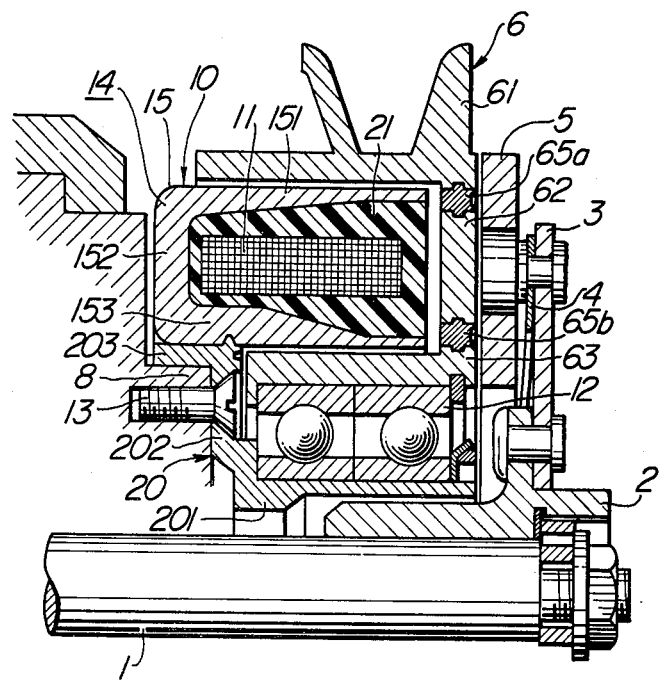
FIG. 1 is a vertical sectional view of the essential portions of an electromagnetic clutch incorporating therein the energizing device comprising one embodiment of the invention.

Embodiments of the invention will now be described by referring to the accompanying drawings. In FIG. 1, there is shown in a vertical sectional view an upper half of an electromagnetic clutch having incorporated therein one constructional form of the energizing device according to the invention. The electromagnetic clutch comprises a hub 2 secured to a rotary shaft 1 of a compressor, not shown, an inputting rotary member 6 formed of a magnetic material substantially in the shape of a letter U in a lying position connected through a V-belt, not shown, to an automotive vehicle engine serving as a drive source, a movable member 5 formed of a magnetic material located in spaced juxtaposed relation to the inputting rotary member 6, a plate spring 4 for securing the movable member 5 to the hub 2 through a support plate 3, and the energizing device 10 for bringing the movable member 5 into and out of frictional engagement with the inputting rotary member 6. The inputting rotary member 6 comprises three pieces 61, 62 and 63 secured together by copper rings 65a and 65b. The energizing device 10 comprises an energizing winding 11. When a current is passed to the energizing winding 11, a magnetomotive force is produced by the winding 11 to produce a magnetic flux along a main magnetic circuit to bring movable member 5 into frictional engagement with the inputting rotary member 6 against the biasing force of the plate spring 4 so that the motive force of the drive source is transmitted by way of the movable member 5, plate spring 4, support plate 3, hub 2 and shaft 1 to the compressor to actuate the latter. When no current is passed to the energizing winding 11, the movable member 5 is kept out of engagement with the inputting rotary member 6 by the biasing force of the plate spring 4.

Figure 2:
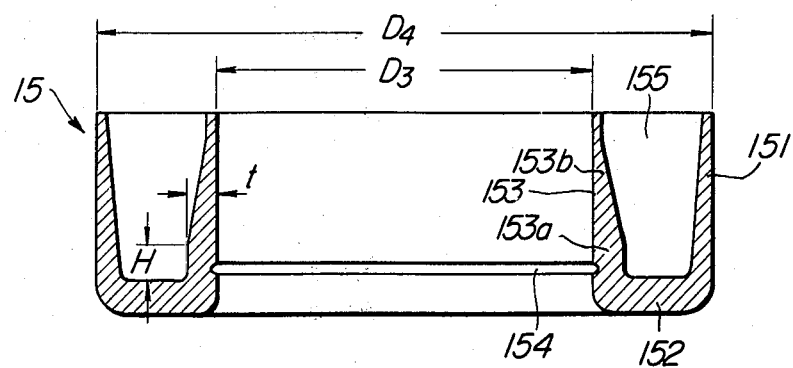
FIGS. 2 to 4 show the manner in which the yoke holder is fitted to the yoke member in the energizing device according to the invention.

The energizing device 10 further comprises a yoke member 15 and a yoke holder 20 which is preferably formed of a non-magnetic material. As shown in FIG. 2, the yoke member 15 includes an outer flange 151, an inner flange 153 and a bottom 152 connecting the two flanges 151 and 153 and has an annular cylindrical shape substantially in the form of a letter U in a lying position.

The yoke member 15 is formed of a doughnut-shaped sheet of low-carbon steel (ferromagnetic soft steel) in one piece by means of a press.

An annular groove 154 is formed on the inner circumferential surface of the inner flange 153 of the yoke member 15. The two flanges 151 and 153 both have a large thickness portion near the bottom 152. The inner flange 153 has near the bottom 152 a large thickness portion 153a of a predetermined thickness t having a height H, and a tapering portion 153b contiguous with the predetermined large thickness portion 153a and successively reduced in thickness in going upwardly until it terminates in an upper small thickness portion. In the embodiment shown, the outer flange 153 has an outer diameter $D_4 = 104$ mm, and the large diameter portion 153a has a height H of 6 mm and a thickness t of 4.5 mm.

Figure 3:
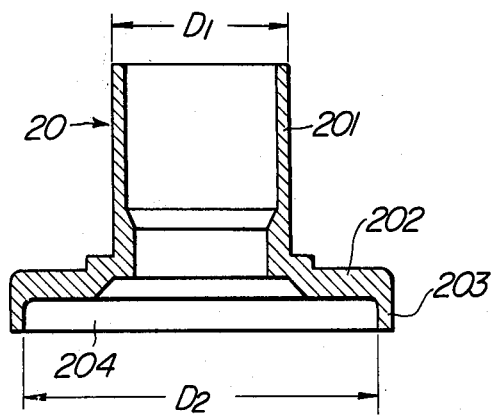

As shown in FIG. 3, the yoke holder 20 includes a cylindrical portion 201, a flange 202 and a bent portion 203. The yoke holder 20 is formed of sheet iron in one piece by cold or hot forming. A bearing 12 (See FIG. 1) is mounted on the outer circumferential surface of the cylindrical portion 201 by force fitting for journalling the inputting rotary member 6. There is an interference between the outer diameter of the bent portion 203 of the yoke holder 20 and the inner diameter of the inner flange 153 of the yoke member 15.

A yoke assembly 14 (See FIG. 1) is formed by inserting the yoke holder 20 in a space defined by the inner flange 153 from the side of the bottom 152 of the yoke member 15, force fitting the outer peripheral surface of the bent portion 203 of the yoke holder 20 to the inner side of the inner flange 153 of the yoke member 15 and clamping the bent portion 203 into place on the inner flange 153.

The yoke holder 20 is, as shown in FIG. 1, screwed as shown at 13 in place on a corner portion 8 of a compressor housing.

Figure 4:
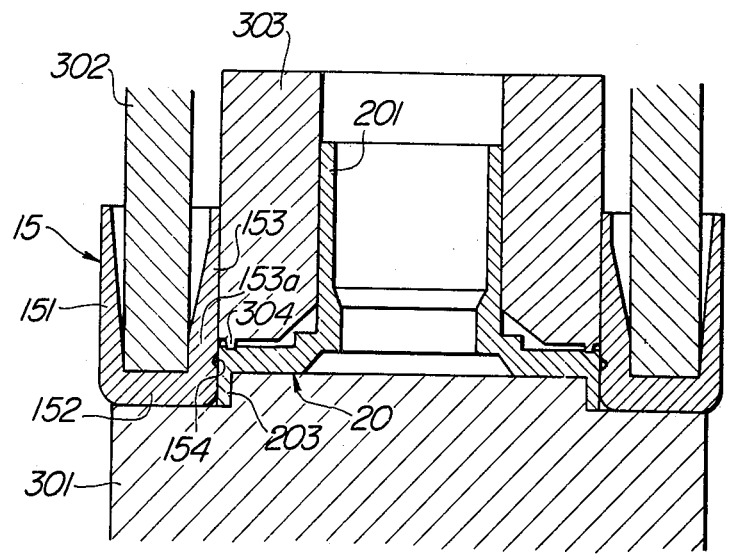

FIG. 4 shows the manner in which the yoke member 15 and yoke holder 20 are securedly interfitted. The yoke holder 20 is inserted in the space defined by the inner flange 153 of the yoke member 15 so that a shoulder of the flange 202 and the bent portion 203 of the former are pressed against the large thickness portion 153a of the inner flange 153 and an inner side of the bottom 152 of the latter. Then the yoke member 15 and yoke holder 20 maintained in the relative positions as aforesaid are clamped by metal dies 301 and 302. The metal die 302 exerts on the yoke member 15 a clamping force which is high enough not to cause plastic deformation of the yoke member 15. Thereafter another metal die 303 is inserted into a space defined between the inner flange 153 of the yoke member 15 and the cylindrical portion 201 of the yoke holder 20. At this time, a portion of the flange 202 of the yoke holder 20 is pushed by a projection 304 at the forward end of the metal die 303 and undergoes plastic deformation so that the material of the flange 202 flows into the annular groove 154 on the inner circumferential surface of the inner flange 153 of the yoke member 15, so that the yoke member 15 and the yoke holder 20 are securedly interfitted. A thrust reducing force (shearing force) acting between the inner flange 153 of the yoke member 15 and the bent portion 203 of the yoke holder 20 is about 6 tons.

Figure 5:
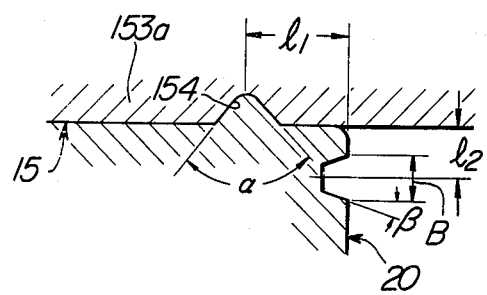
FIG. 5 shows in detail the joint formed between the yoke member and the yoke holder according to the invention.

FIG. 5 shows in detail the joint formed between the yoke member 15 and the yoke holder 20. Preferably, the groove 154 on the inner circumferential surface of the inner flange 153 of the yoke member 15 is spaced from the upper surface of the flange 202 of the yoke holder 20 a distance $l_1 = 1.0 - 1.2$ mm and has an angle of inclination $\alpha = 80° - 120°$. Preferably, the recess formed on the flange 202 of the yoke holder 20 by the projection 304 of the metal die 303 is spaced from the upper surface of the flange 202 a distance $l_2 = 0.6 - 0.8$ mm and has an angle of inclination $\beta = 30° - 45°$ and a width $B = 0.3 - 0.8$ mm. Preferably, the groove 154 has a width 0.6–1.6 mm at its top and a depth 0.1–1.0 mm, or more preferably 0.2–0.6 mm. The bottom of the groove 154 may be either curved as shown or flat (in this case the groove is trapezoidal in cross section).

After the yoke holder 20 is fitted to the yoke member 15 to provide the yoke assembly 14 as described hereinabove, the outer circumferential surface of the cylindrical portion 201 of the yoke holder 20 is machined by using the outer circumferential surface of the outer flange 151 of the yoke member 15 and the inner circumferential surface 153 (having a diameter $D_3$ in FIG. 2) thereof as reference surfaces. The outer and inner circumferential surfaces 151 and 153 of the yoke member 15 can be readily given with concentricity when formed by means of a press because they belong to the same member. Their concentricity is not affected essentially by the fitting of the yoke holder 20 to the yoke member 15 because of the cross sectional shape of the yoke member 15 and the careful selection of the position in which the joint is formed between them as described hereinabove.

Figure 6:
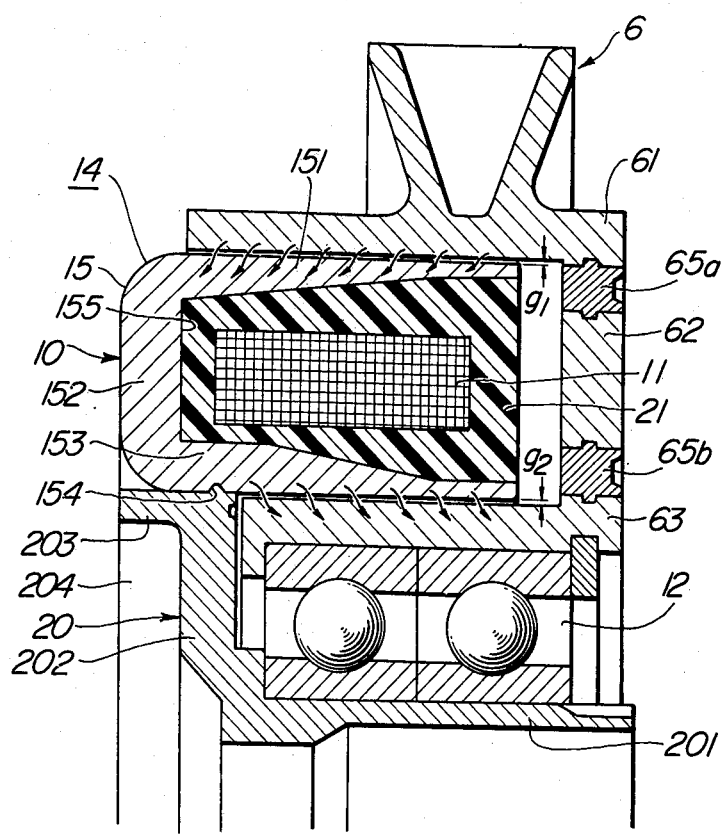
FIG. 6 is a view in explanation of the features of the invention.

Thus by machining the outer circumferential surface of the cylindrical portion 201 of the yoke holder 20 by using the outer and inner circumferential surfaces of flanges 151 and 153 of the yoke member 15 as reference surfaces, it is possible to render the cylindrical portion 201 concentric with the flanges 151 and 153 with a high degree of precision so that gaps $g_1$ and $g_2$ (See FIG. 6) between the yoke assembly 14 and inputting rotary member 6 can have substantially the same values as designed.

After the machining of the cylindrical portion 201 of the yoke holder 20 is finished, the inner circumferential surface of the bent portion 203 of the yoke holder 20 is machined by using the outer and inner flanges 151 and 153 of the yoke member 15 as reference surfaces, and then the undersurface of the flange 202 thereof is machined to be at a right angle to the inner circumferential surface of the bent portion 203, to form an opening 204 (See FIG. 6) for forming a spigot joint.

The corner portion 8 of the compressor housing has a right angle and its outer circumferential surface is machined to be concentric with the axis of the rotary shaft 1, so that when the corner portion 8 is inserted in the opening 204 of the yoke assembly 14 to form a spigot joint, the yoke assembly 14 can be fitted to the compressor housing in such a manner that the outer and inner circumferential surfaces of the yoke assembly 14 is concentric with respect to the axis of the rotary shaft 1.

The energizing winding 11 is inserted in a space 155 defined in the yoke member 15 of the yoke assembly 14 fitted in place as aforesaid, and an insulating resin 21 is poured into the space 155 to set and secure the winding 11 to the yoke member 15, to thereby provide the energizing device 10.

In order to obtain a satisfactory magnetic function, the yoke assembly 14 of the energizing device 10 is preferably constructed such that the gaps $g_1$ and $g_2$ between it and the inputting rotary member 6 which is supported concentrically with the yoke assembly 14 through the bearing 12 are minimized. However, in actual practice, these gaps are required to have values in the range between 0.2 and 0.5 mm from the standpoint of preventing mutual interference between a stationary member and a rotary member.

To this end, it is necessary that the diameters $D_3$ and $D_4$ of the yoke member 15 have a tolerance of about 0.1 mm when the yoke member 15 is formed by means of a press. It is necessary that the deformation of the yoke member 15 be reduced to below 0.2 mm when the yoke holder 20 is fitted thereto to provide the yoke assembly 14. It is important that the yoke member 15 be concentric with the yoke holder 20. To attain this end, it is particularly necessary to machine the outer circumferential surface of the cylindrical portion 201 of the yoke holder 20 and the inner circumferential surface of the bent portion 203 thereof to give precise finishes thereto to maintain the concentricity of the cylindrical portion 201 (with the diameter $D_1$) and the bent portion 203 (with the diameter $D_2$) at a high level of precision (below $\pm 0.1$ mm) (See FIG. 3). Other portions of the yoke holder 20 need not be machined.

On the other hand, when the yoke member 15 is produced by means of a press which is high in productivity, the outer and inner flanges 151 and 153 of the yoke member 15 preferably have a minimum thickness. If the outer and inner flanges 151 and 153 of the yoke member 15 are tapering in shape, it is possible to increase the thickness of the lower portions of the flanges where the magnetic flux flows in large amount and to reduce the thickness of the upper portions thereof where the amount of magnetic flux is small. Thus working by a press can be readily performed and yet the density of the magnetic flux in various portions of the yoke member 15 can be rendered uniform. From this viewpoint, the flanges 151 and 153 of the yoke member 15 are preferably tapering in shape.

However, when the yoke holder 20 is fitted to the yoke member 15 in such a manner that a portion of the flange 201 of the yoke holder 20 is caused to undergo plastic deformation to let its material flow into the groove 154 formed on the inner circumferential surface of the inner flange 152 of the yoke member 15 to form a joint as described hereinabove, the following trouble will occur.

That is, the outer and inner flanges 151 and 153 of the yoke member 15 are spaced apart from the inputting rotary member 6 by the small gaps $g_1$ and $g_2$ of predetermined values, and no changes should be caused to occur in the values of the gaps by the fitting of the yoke holder 20 to the yoke member 15.

However, when the yoke holder 20 is fitted to the yoke member 15 as shown in FIG. 4 and described hereinabove, the inner flange 153 of the yoke member 15 is urged radially outwardly by a force of high magnitude and tends to be deformed. The inner flange 153 is spaced apart from the inputting rotary member 6 by a small gap as aforesaid, so that the inner flange 153 has as great a thickness as possible. Meanwhile, the yoke holder 20 should be formed with the opening 204 for receiving the corner portion 8 of the compressor housing to form a spigot joint, and this makes it necessary that the groove 154 on the inner circumferential surface of the inner flange 153 in which the joint is formed between the yoke member 15 and yoke holder 20 be located slightly upwardly of the bottom 152 of the yoke member 15. Thus the inner flange 153 should have the predetermined thickness portion 153a of a certain height extending upwardly from the bottom 152 of the yoke member 15 toward its upper opening.

After the yoke holder 20 is fitted to the yoke member 15, it is necessary that the joint formed between the yoke member 15 and yoke holder 20 have relatively high rigidity to enable the clamping force produced by elastic deformation of the flange 202 of the yoke holder 20 to be retained at a high level. Stated differently, the presence of the predetermined thickness portion 153a is essential.

For the reasons stated hereinabove, the inner flange of the yoke member according to the invention has the predetermined thickness portion 153a of a predetermined height extending upwardly from the bottom 152 of the yoke member 15 and the tapering portion 153b contiguous with the predetermined thickness portion 153a.

Figure 7:
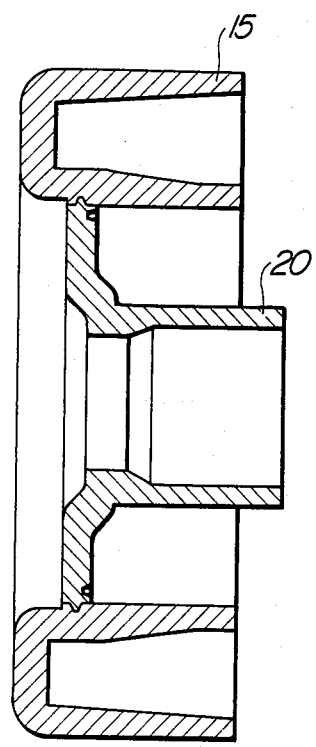
FIG. 7 is a vertical sectional view of the yoke assembly of the energizing device comprising another embodiment of the invention.

FIG. 7 shows another constructional form of the present invention which is similar to the embodiment shown and described hereinabove except that it lacks the bent portion 203 of the yoke holder 20.

From the foregoing description, it will be appreciated that according to the present invention, the energizing device for the electromagnetic clutch includes a yoke assembly composed of two members or the yoke member and yoke holder, and the yoke member is formed with outer and inner flanges of which the inner flange has a predetermined thickness portion of a predetermined height extending upwardly from the bottom of the yoke member and a tapering portion. The yoke assembly for producing a magnetic flux can be readily produced because it has a smaller number of joints and surfaces requiring machining than that of the prior art.

What is claimed is:

1. In an electromagnetic clutch comprising:
a cylindrical rotor for introducing motive force from a drive source into the magnetic clutch formed at one end thereof with a surface for magnetic frictional engagement;
a motive force transmitting member located in spaced apart juxtaposed relation to said surface for magnetic frictional engagement of said cylindrical rotor and having a surface adapted to be brought into and out of magnetic frictional engagement with said surface of said cylindrical rotor;
a rotary shaft mechanically connected to said motive force transmitting member for rotation about an axis aligned with the axis of rotation of said cylindrical rotor;
energizing means including a fixed cylindrical casing, a holding member for fixedly securing said cylindrical casing in a predetermined position and a winding housed in said cylindrical casing, said energizing means being located in spaced juxtaposed relation to a surface of said end of said cylindrical rotor opposite to said surface thereof adapted to be brought into and out of magnetic frictional engagement with said motive force transmitting member, said cylindrical casing including a cylindrical outer wall and a cylindrical inner wall disposed in spaced juxtaposed relation to cylindrical walls of said cylindrical rotor and extending toward said motive force transmitting member, said cylindrical outer wall and said cylindrical inner wall each having as seen in cross section a planar surface on the side thereof which faces one of said cylindrical walls of said cylindrical rotor and a surface inclined at an acute angle with respect to said planar surface on the side of the wall which faces the winding so that the outer and inner cylindrical walls taper in the direction toward said motive power transmitting member, said motive power transmitting member being magnetically attracted into engagement with said surface of said cylindrical rotor when a current is passed to said winding to transmit motive force from said cylindrical rotor to said rotary shaft;

the improvement comprising a first portion of said cylindrical casing of said energizing means forming a bottom of said cylindrical casing interconnecting said cylindrical outer wall and said cylindrical inner wall at ends thereof remote from said motive force transmitting member, and a second portion of said cylindrical casing contiguous with said first portion and extending upwardly from said first portion along the cylindrical wall and beyond a portion of said inner wall which contacts with the holding member, said first portion and said second portion being substantially equal to each other and larger than other portions of the cylindrical walls of said cylindrical casing in thickness.

2. An electromagnetic clutch as claimed in claim 1, wherein the improvement further comprises the arrangement whereby said energizing means is force fitted to said holding member at one end of said first portion forming the bottom of said cylindrical casing and at said second portion in said cylindrical inner wall.

3. An electromagnetic clutch as claimed in claim 1, wherein the improvement further comprises the arrangement whereby said energizing means is force fitted to said holding member at said second portion in said cylindrical inner wall.

4. An electromagnetic clutch as claimed in claim 2 or 3, wherein the improvement further comprises an annular groove formed on said second portion into which a portion of the material of said holding member is flowed as a result of plastic deformation of the latter.

5. An electromagnetic clutch as claimed in claim 4, wherein the improvement further comprises the arrangement whereby said annular groove is rounded at the bottom and substantially V-shaped in cross section.

6. An electromagnetic clutch as claimed in claim 4, wherein the improvement further comprises the arrangement whereby said annular groove is planar at the bottom and substantially trapezoidal in cross section.

7. In an electromagnetic clutch comprising:

a cylindrical rotor for introducing motive force from a drive source into the magnetic clutch formed at one end thereof with a surface for magnetic frictional engagement;

a motive force transmitting member located in spaced apart juxtaposed relation to said surface for magnetic frictional engagement of said cylindrical rotor and having a surface adapted to be brought into and out of magnetic frictional engagement with said surface of said cylindrical rotor;

a rotary shaft mechanically connected to said motive force transmitting member for rotation about an axis aligned with the axis of rotation of said cylindrical rotor;

energizing means including a fixed cylindrical casing, a holding member for fixedly securing said cylindrical casing in a predetermined position and a winding housed in said cylindrical casing, said energizing means being located in spaced juxtaposed relation to a surface of said end of said cylindrical rotor opposite to said surface thereof adapted to be brought into and out of magnetic frictional engagement with said motive force transmitting member, said cylindrical casing including a cylindrical outer wall and a cylindrical inner wall disposed in spaced juxtaposed relation to cylindrical walls of said cylindrical rotor and extending toward said motive force transmitting member, said cylindrical outer wall and said cylindrical inner wall each having as seen in cross section a planar surface on the side thereof which faces one of said cylindrical walls of said cylindrical rotor and a surface inclined at an acute angle with respect to said planar surface on the side of the wall which faces the winding so that the outer and inner cylindrical walls taper in the direction toward said motive power transmitting member, said motive power transmitting member being magnetically attracted into engagement with said surface of said cylindrical rotor when a current is passed to said winding to transmit motive force from said cylindrical rotor to said rotary shaft;

the improvement comprising a first portion of said cylindrical casing of said energizing means forming a bottom of said cylindrical casing interconnecting said cylindrical outer wall and said cylindrical inner wall at ends thereof remote from said motive force transmitting member, and a second portion of said cylindrical casing contiguous with said first portion and extending upwardly from said first portion along the cylindrical inner wall and beyond a portion of said inner wall which contacts with the holding member, said first portion and said second portion being substantially equal to each other and larger than other portions of the cylindrical walls of said cylindrical casing in thickness, and wherein said energizing means is force fitted to said holding member at least at said second portion in said cylindrical wall, wherein an annular groove is formed on said second portion with a portion of the material of said holding member being flowed into said groove as a result of plastic deformation of the holding member, said annular groove being rounded at the bottom and substantially V-shaped in cross section, and wherein said annular groove has a width ranging from 0.6 to 1.6 mm at the top and a depth ranging from 0.1 to 1.0 mm, preferably ranging from 0.2 to 0.6 mm.

8. An electromagnetic clutch as claimed in claim 7, wherein the improvement further comprises the arrangement whereby opposing walls of said annular groove form an angle in the range between 80° and 120°.

9. An electromagnetic clutch comprising:
a fixed base;
a rotary shaft rotatably supported by said fixed base;
a magnetic plate connected to said rotary shaft for movement axially of said rotary shaft including a surface perpendicular to said axis of said rotary shaft;
a cylindrical rotor for introducing motive force into the magnetic clutch including a wall having a surface disposed in a slightly spaced juxtaposed relation to said surface of said magnetic plate, and a first cylindrical wall and a second cylindrical wall concentric with each other and extending from said wall in a direction opposite to said magnetic plate;

a fixed housing including a third wall, a fourth wall and a fifth wall, said third wall and said fourth wall constituting an outer cylindrical wall and an inner cylindrical wall respectively arranged concentrically to provide a double wall cylindrical structure extending toward said magnetic plate, said fifth wall constituting a doughnut-shaped bottom of said double wall cylindrical structure connecting together said third wall and said fourth wall at ends thereof remote from said magnetic plate, said third wall and said fourth wall being disposed in slightly spaced juxtaposed relation to said first wall and said second wall respectively to said cylindrical rotor, said third wall being contiguous with said fifth wall and tapering in the direction toward said magnetic plate and said fourth wall including a lower portion of constant thickness contiguous with said fifth wall and extending for a predetermined length in the direction of the magnetic plate and a tapering portion contiguous with said constant thickness lower portion and having its thickness successively reduced in the direction toward the magnetic plate, said constant thickness lower portion of said fourth wall and said fifth wall having a larger thickness than other portions of the walls;

a winding housed in said fixed housing and embedded in an insulating material filled in said housing; and an attachment force-fitted to said housing in an area of said housing having said larger thickness so as to firmly secure said housing to said base.

10. An electromagnetic clutch as claimed in claim 9, wherein said attachment is force-fitted to said housing at said fifth wall.

11. An electromagnetic clutch as claimed in claim 9, wherein said attachment is force-fitted to said housing at least at the lower constant thickness portion of said fourth wall.

* * * * *